Patented Dec. 20, 1949

2,491,720

UNITED STATES PATENT OFFICE 2,491,720

INVOLUTE GENERATING SPUR GEAR MILLING CUTTER

Karl Frei, Arbon, Switzerland, assignor to Aktiengesellschaft Adolph Saurer, Arbon, Switzerland Application January 30, 1945, Serial No. 575,250
In Switzerland December 14, 1943

1 Claim. (Cl. 29—104)

This invention relates to involute generating milling cutters and more especially to cutters, whose bodies are formed of a plurality of toothed discs, whose contacting surfaces extend normally to their common axis of rotation, the teeth of the assembly of discs being arranged in a helical row.

In the cutters according to this invention the teeth on the assembled discs form at least two such helical rows and the thickness of the individual disc equals the pitch of the helixes divided by the number of helical rows of teeth.

One embodiment of the present invention is illustrated by way of example only, in the accompanying drawings in which Fig. 1 is a face view of an involute generating milling cutter;

Figure 1:
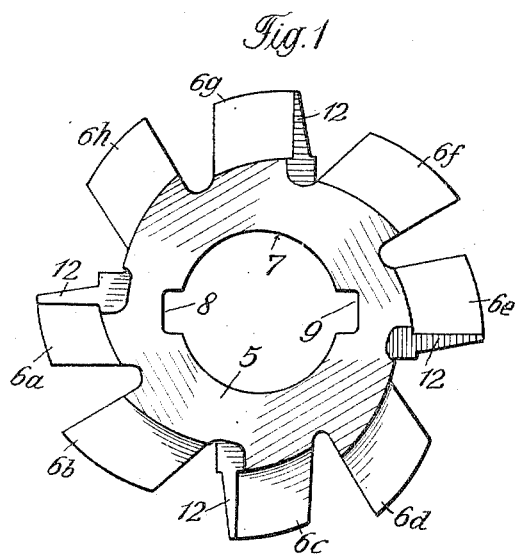

The involute generating milling cutter is composed of congruent discs 1, 2, 3, 4 which are keyed on an arbor, bearing against each other along planes A—A, B—B, C—C. Each disc 5 is formed with cutting teeth 6a–6h, and the teeth on the assembled discs are arranged in two helical rows. The thickness of each disc is equal to half the pitch of an individual helix.

The two helical rows of teeth are staggered circumferentially by 180°, so that on the circumference of each disc only one row of cutting teeth is present which can be machined without any difficulty. Due to the fact that each disc carries two congruent half-turns of cutting teeth that are staggered by 180° the individual discs can be arranged on a milling arbor in either one of two positions which are offset relative to each other by 180°. To this end the bores 7 of the discs are each provided with oppositely disposed keyways 8 or 9.

When three or more helical turns of cutting teeth are provided the keyways may be uniformly spaced on the circumference of the bore 7. In the rows of consecutive cutting teeth 6a, 6b, 6c etc. one of the flanks 10a, 10b, 10c of alternate cutting teeth are mutually offset, so that the teeth cut with one side edge 11a, 11b, 11c only and, therefore, work alternately only one face of the gear tooth to be generated.

Figure 2:
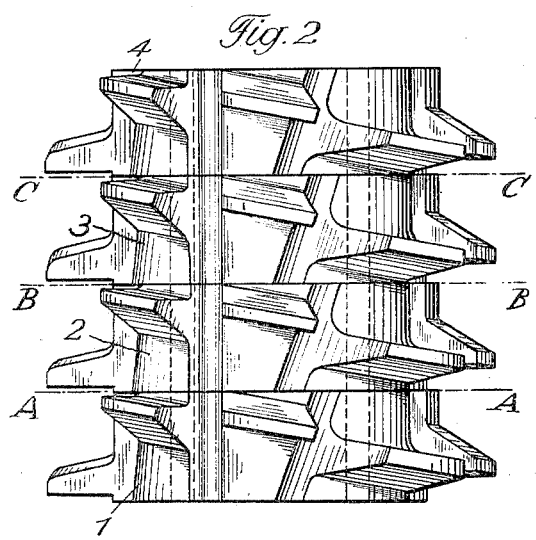
Fig. 2 is a top plan view of Fig. 1.
Figure 3:
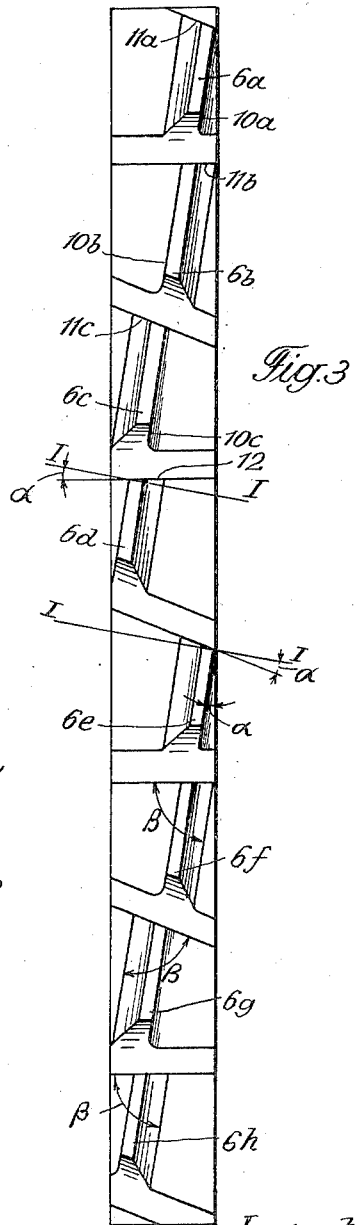
Fig. 3 shows the teeth of a milling cutter disc in a development of the circumference of said disc.

As shown in Figs. 2 and 3 the cutting separation surfaces 12, which extend away from the body 5 at right angles to the coordinated tangential plane, are turned out of the cross sectional plane I—I including the tooth profile through an acute angle α, so that the cutting angle β becomes smaller than 90°. The angle α formed between the cutting separation surface 12 and said cross sectional plane including the tooth profile corresponds in regard to its angular range to the pitch angle of the milling cutter helix so that one half of the cutting separation surfaces 12 extends parallel to the pivot axis of the milling cutter, which is advantageous for the manufacture of the milling cutter.

I wish it to be understood that I do not desire to be limited to the details of construction shown and described, for obvious modifications will occur to a person skilled in the art.

I claim:

An involute generating milling cutter for spur gears comprising in combination, a plurality of congruent disc members mounted side by side for rotation about a common axis, the contacting faces of the disc members extending normally to that axis, cutting teeth on the circumferences of said disc members, the teeth of each disc member being arranged in relatively staggered positions to form at least two separate helical rows of teeth, the width of the individual disc members being equal to the pitch of one of said helical rows of teeth divided by the number of such rows and the staggering angle of the helical rows of teeth being equal to 360° divided by the number of convoluting rows of teeth, said teeth being formed with radially extending flank surfaces for the detaching of cuttings on one tooth, the angle enclosed between said cuttings-detaching flank surface and the normal profile plane being equal to the pitch of said helical row of teeth, and the detaching flank surface of each alternate tooth extending parallel to the axis of rotation, the cutting surface on alternate teeth being on alternate sides of the teeth.

KARL FREI.

REFERENCES CITED

The following references are of record in the file of this patent:

UNITED STATES PATENTS

| Number | Name | Date |
|---|---|---|
| 963,464 | McGregor | July 5, 1910 |
| 1,495,067 | Conklin | May 20, 1924 |

FOREIGN PATENTS

| Number | Country | Date |
|---|---|---|
| 255,399 | Great Britain | July 22, 1926 |
| 576,843 | Germany | May 22, 1933 |